United States Patent [19]

Williams

[11] 3,715,915
[45] Feb. 13, 1973

[54] LIGHT INTENSITY STRAIN ANALYSIS

[75] Inventor: Jerry G. Williams, Hampton, Va.

[73] Assignee: The United States of America as represented by the Administrator of National Aeronautics and Space Administration

[22] Filed: April 28, 1971

[21] Appl. No.: 138,230

[52] U.S. Cl..................................73/88 A, 356/32
[51] Int. Cl..............................................G01b 11/18
[58] Field of Search .73/88 A; 350/149, 162; 356/32, 356/33, 34, 35

[56] References Cited

UNITED STATES PATENTS

| 2,294,897 | 9/1942 | Ellis | 73/88 A |
|---|---|---|---|
| 3,034,342 | 5/1962 | Riegner | 73/88 A |
| 3,034,395 | 5/1962 | Zandman | 73/88 A X |
| 3,184,961 | 5/1965 | Bell | 73/88 A |
| 3,462,223 | 8/1969 | Tiemann et al. | 356/32 |

Primary Examiner—Jerry W. Myracle
Attorney—Howard J. Osborn, Wallace J. Nelson and John R. Manning

[57] ABSTRACT

A process for the analysis of the strain field of structures subjected to large deformations involving a low modulus substrate having a high modulus, relatively thin coating thereon. The optical properties of transmittance and reflectance are measured for the coated substrate while stressed and unstressed to thereby indicate the strain field for the coated substrate.

13 Claims, 7 Drawing Figures

INVENTOR.
JERRY G. WILLIAMS
BY
ATTORNEYS

INVENTOR.
JERRY G. WILLIAMS
BY Howard J. Osborn
Wallace J. Nelson
ATTORNEYS

LIGHT INTENSITY STRAIN ANALYSIS

ORIGIN OF THE INVENTION

This invention was made by an employee of the National Aeronautics and Space Administration and may be manufactured and used by or for the United States Government for governmental purposes without the payment of any royalties thereon or therefor.

This invention relates to a light intensity measurement strain technique (LIMSAT) wherein a transparent low modulus substrate is provided with a high modulus, relatively thin coating thereon and the optical properties of transmittance and reflectance measured for the coated substrate under both stressed and unstressed conditions.

In the selection of structural materials for use in aerospace structures and the like the analysis of the strain field for the various materials is extremely important particularly when the final structure may be subject to large deformations. Presently used experimental techniques applicable to the structural analysis of large deformation problems involve the use of moire, grid, photoelasticity, brittle coatings, and holography. In general, these methods are either limited in the magnitude of the strain level for which accurate measurements may be made, or are extremely complex time-consuming and expensive to experimentally set up and implement.

It is therefore an object of the present invention to provide a new and unobvious process for determining the strain field of a structural specimen.

Another object of the present invention is a process for determining the strain of a structural specimen at varying degrees of stress on the member.

Another object of the present invention is a process for detecting the strain field of a prestressed structural substrate.

According to the present invention, the foregoing and other objects are attained by providing a low modulus, transparent, polymeric, structural material specimen, depositing a relatively thin metallic coating on one surface of the specimen, measuring the optical properties of transmittance and reflectance of the film-coated specimen, subjecting the coated specimen to biaxial stress loads while continuously measuring the transmittance and reflectance properties with the changes in these property characteristics during loading being indicative of the strain field of the structural specimen.

In another application of the present process, a low modulus, transparent, polymeric, structural specimen is subjected to a predetermined stress load and, while the specimen is stressed, a thin coating of a high modulus metal is applied to one surface thereof. The optical property characteristics of transmittance and reflectance are then measured continuously while the stress loads are gradually removed to thereby give indications of the strain field for the structural specimen.

In another application of the present invention, a low modulus polymeric coating is bonded to a high modulus structural model for example, a metal structure, and subsequently a thin film metallic coating is deposited on the polymeric coating. Strain changes in the high modulus structure are transferred through the low modulus polymer and into the thin film metallic coating. The optical property characteristics of reflectance of the thin metallic coating are then measured to thereby give indications of the strain field of the structural specimen.

A more complete appreciation of the present invention and many of the attendant advantages thereof will be readily appreciated as the same becomes better understood by reference to the following detailed description when considered in connection with the accompanying drawings wherein:

Figure 1:
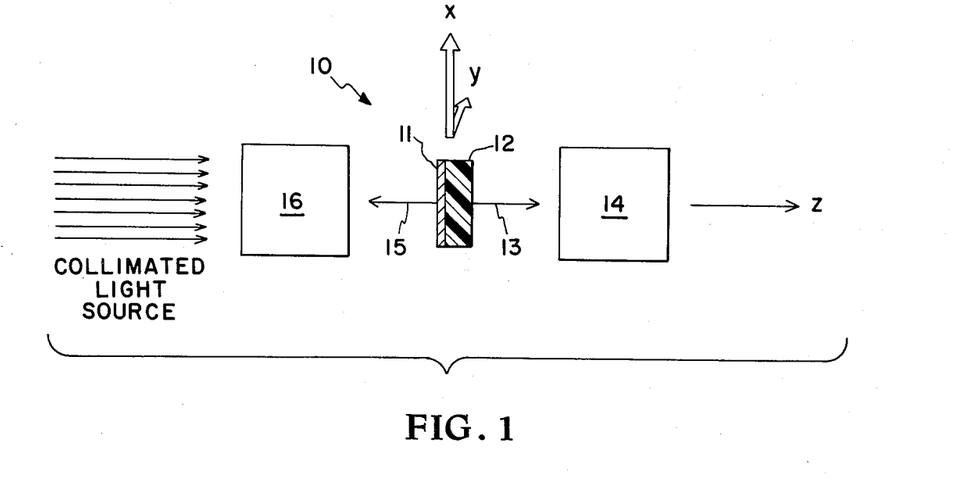
FIG. 1 is a schematic representation of a normal incidence scanning system for measuring either transmitted or reflected light intensity of a coated structural specimen.

Referring now more particularly to the drawings, in FIG. 1, reference numeral 10 generally designates a normal incidence scanning system for measuring either transmitted or reflected light intensity. In this arrangement the collimated uniform intensity light source is directed toward the thin metallic coating 11 on the low modulus substrate or specimen 12. Light transmitted by the coated substrate is represented by arrow 13 and is directed to a suitable transmittance light intensity measurement instrument 14. The light reflected by the metallic coating 11 is represented by arrow 15 to a suitable reflectance light intensity measurement instrument 16. The metallic coating 11 is, of necessity, very thin in order to permit any transmittance. COatings in the thickness range of 20 to 500 angstroms are considered applicable for the present invention with the transmittance and reflectance optical property characteristics of the metallic coating being indicative of the strain being placed on the coated specimen 12. Arrows X and Y in each of the figures represents the planar strain or stress applied to specimen 12, with Y representing a plane taken perpendicular to the paper. Arrow Z in each of the figures indicates the light beam direction.

Figure 2:
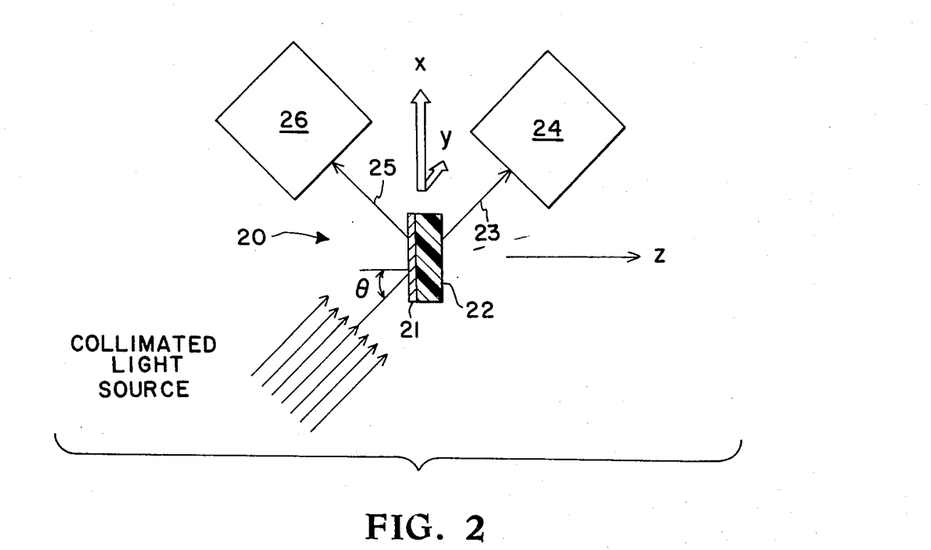
FIG. 2 is a schematic representation of instrumentation for making non-normal incidence measurements.

Referring now more particularly to FIG. 2, reference numeral 20 generally designates the instrumentation arrangement for making non-normal incidence measurements. The collimated uniform intensity light source is directed toward the thin metallic film 21 on the low modulus specimen substrate 22 at an angle $\theta$. The transmitted light is represented by arrow 23 and is measured by a suitable transmittance measuring instrument 24. The light reflected by the thin metallic film 21 is represented by arrow 25 and measured by a suitable reflectance light intensity measurement instrument 26.

Figure 3:
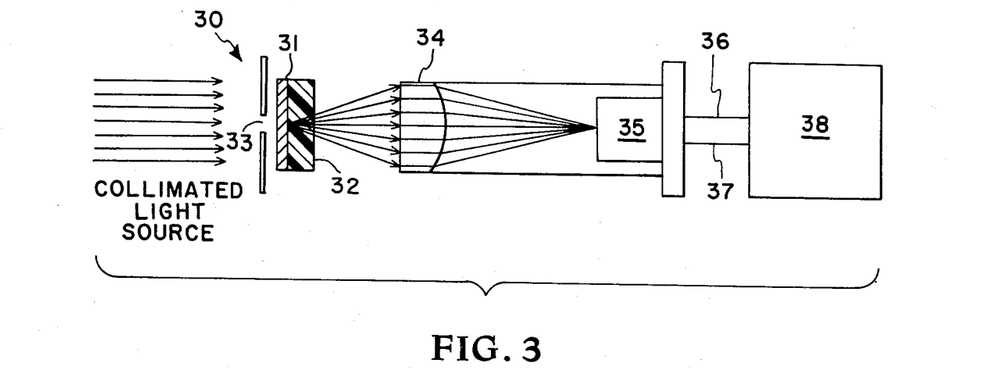
FIG. 3 is a schematic representative of the basic instrumentation for making total transmittance measurements.

Referring now to FIG. 3, reference numeral 30 generally designates the basic instrumentation for making total transmittance measurements. The collimated, uniform intensity light source is directed through a small diameter aperture 33 toward the thin metallic film 31 on the low modulus substrate or specimen 32. The small amount of light transmitted by the thin metallic film 31 and the coated substrate 32 is collected by a relatively large diameter collector lens 34 and redirected to a point on sensitive photomultiplier tube 35. The photomultiplier tube 35 directs an electrical response to the light received via electrical lead wires 36 and 37 to a suitable amplifier and recorder mechanism as designed by block 38.

Figure 4:
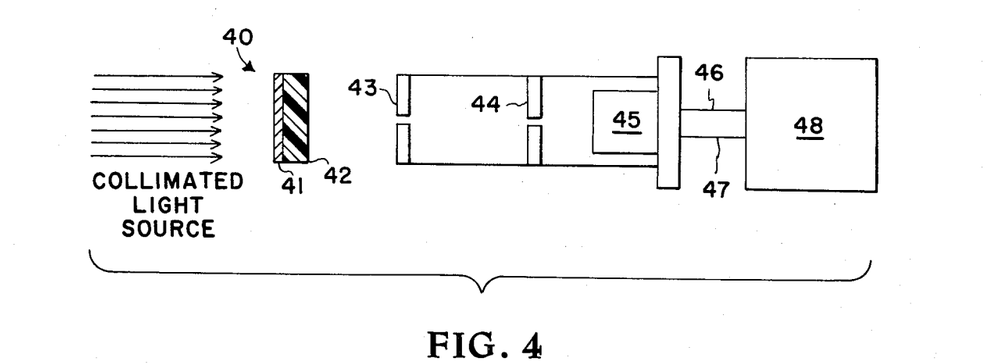
FIG. 4 is a schematic representation of the basic instrumentation for making central image transmittance measurements.

Referring now to FIG. 4, reference numeral 40 generally designates the basic instrumentation required for making central image transmittance measurements. In this arrangement the collimated uniform intensity light source is directed toward the thin metallic coating 41 on the low modulus substrate 42. A collimating set of small diameter apertures 43 and 44 receive the zero-order component of the light transmitted and diffracted by the thin metallic coating 41. The light transmitted by apertures 43 and 44 is received on photomultiplier tube 45 which directs an electrical response through lead wires 46 and 47 to a suitable amplifier and recorder mechanism 48.

Figure 5:
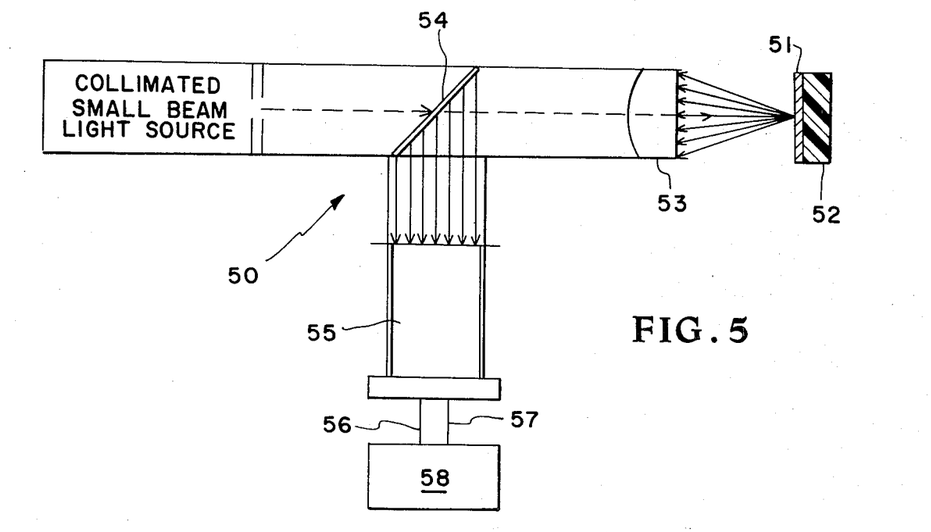
FIG. 5 is a schematic representation of the basic instrumentation for making total reflectance measurements.

Referring now to FIG. 5, reference numeral 50 generally designates the basic instrumentation for making total reflectance measurements. A collimated light source with a small diameter beam is directed toward a thin metallic coating 51 on low modulus substrate 52. The small beam of light is reflected and collected by a relatively large diameter collector lens 53 and redirected via a suitable beam splitter 54 to photomultiplier tube 55. The photomultiplier tube 55 transmits an electrical impulse through lead wires 56 and 57 to a suitable amplifier and recorder mechanism as represented by block 58.

Figure 6:
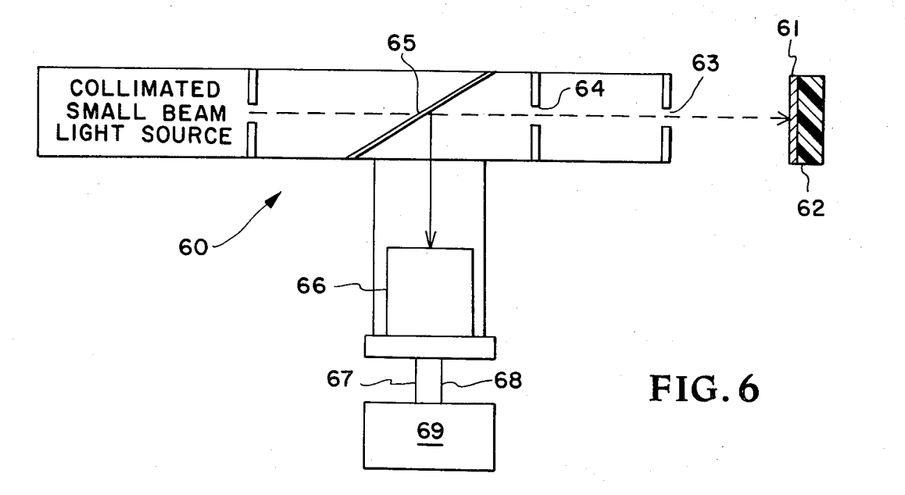
FIG. 6 is a schematic representation of the basic instrumentation for making central image reflectance measurements.

Referring now to FIG. 6, reference numeral 60 generally designates the basic instrumentation for making central image reflectance measurements. Here, a collimated light source with with a small diameter beam is directed toward the thin metallic coating 61 on the low modulus substrate 62, through a pair of collimating small diameter apertures 63 and 64. The small diameter beam received on thin film 61 is reflected back through apertures 63 and 64 to a beam splitter 65. The reflected light is directed from beam splitter 65 onto photomultiplier tube 66. An electrical impulse is transmitted through wires 67 and 68 from photomultiplier tube 66 to a suitable amplifier and recording mechanism as represented by block 69.

Figure 7:
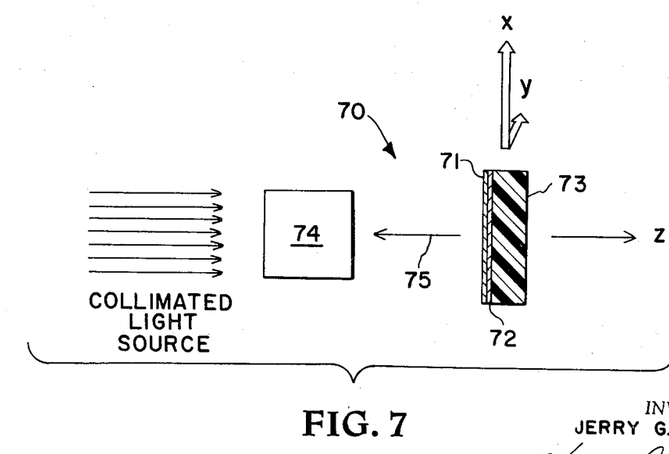
FIG. 7 is a schematic representation of the instrumentation required for making reflectance measurements for determining strains of high modulus opaque structural substrates.

Referring now to FIG. 7, reference numeral 70 generally designates the basic instrumentation for making reflectance measurements for opaque high modulus structural specimens such as metal structures. In this arrangement a field of uniform intensity collimated light is directed toward the thin metallic coating 71 on the thin low modulus elastomeric substrate 72 which is bonded to a high modulus structural specimen 73. Light reflected by thin metallic coating 71 is represented by arrow 75 and is directed to a suitable light intensity measurement instrument 74. Typically, total reflectance and central image reflectance measurements may be made by the instrumentation previously described in reference to FIGS. 5 and 6. A metallic coating of 20 to 500 angstroms and a low modulus substrate of 0.005 to 0.100 inch thickness are considered applicable for the present invention. Best results are obtained where the low modulus substrate is opaque to thereby provide an absorbing substrate and eliminate multiple reflections between the high modulus structural substrate and the thin metallic film.

The basis for the present invention of a strain analysis process is in the optical property changes between initial and final stressed conditions of a thin metallic film deposited on a low modulus substrate. Specifically, the relationship between the mechanical state or strain field of a structural specimen subjected to planar stress may be obtained by either the transmittance or reflectance data obtained before, during, and after stressing of the coated specimen.

Two fundamental types of reflectance and transmittance properties are related to the mechanical state of the substrate. The first type may be termed total transmittance or total reflectance and is defined as the ratio of the total energy of incident light which is transmitted or reflected by the substrate to the total incident energy. A change in the total transmittance or reflectance as a result of a change in the mechanical state of the substrate may be caused due to a change in the film effective thickness or due to the development of microfractures in the film coating or both. The second type is termed central image transmittance or central image reflectance and is defined as the ratio of the intensity of the zero order of transmitted or reflected light to the intensity of the incident light. It is associated with the development in the metallic film of a periodic set of closely spaced wrinkles which form a diffraction grating. The diffraction grating spatially redistributes the incident light energy by deflecting energy out of the zero order component and into higher order components. Such a set of wrinkles, and consequently diffraction, occurs only if the thin film is subjected to a compression strain. Otherwise, the central image property reverts to the total transmittance or total reflectance case. Measurements of both transmittance and reflectance sets of data do not result in two independent solutions but may serve as a check against each other. The drawing Figures described hereinbefore are schematic representations of the various instrument systems employed for making the measurements needed.

Thus, a set of either total and central image transmittance or total and central image reflectance data is necessary and sufficient for the complete identification of the strain field of many plane stress problems. To achieve an independent set of responses for both the total and central image transmittance or the total and central image reflectance, it is necessary that at least one of the principle strains at each point in the field be compressive. For a strain at a point which is positive in one or both principle directions, a compression strain field may be imposed on the metallic film coating by depositing the metallic co-ting on the substrate after the substrate has been preloaded and subsequently making optical measurements after the preload has been released.

In a specific example of this technique a silicone rubber substrate was subjected to a uniaxial preload (imposing a strain in the direction of preload of 62 percent) and then deposited with a thin film of aluminum having an initial transmittance of thirty-six percent. Upon release of the preload the specimen was examined microscopically and line elements characteristic of microfractures were observed to have developed parallel to the direction of prestretch, and line elements characteristics of wrinkling were observed to have developed transverse to the direction of prestretch. Strains imposed on the coating by the release of preload are negative or compressive, along the direction parallel to the direction of prestretch and positive, or tensile, in the direction perpendicular to the prestretch direction. The wrinkling due to compressive loading along the direction of preload and microfractures due to failure of the film in tension, along the direction transverse to the direction of the applied prestress, were as predicted. Regular patterns of ridges and valleys characteristic of thin film compressive wrinkling were also shown in a scanning electron microscope examination. Specimens have also been examined with a microscope after having been uniaxially loaded to selected magnitudes of strain in a test frame. Wrinkle and microfracture line elements characteristic of compressive wrinkling and tensile fracture were observed. The necessary property for the development of a high frequency periodic wrinkle pattern is that the stiffness of the thin metallic coating be small relative to the substrate spring constant. Such a closely spaced periodic pattern of metallic thin film wrinkles acts as a diffraction grating.

The two factors which primarily influence the change in the total transmittance or reflectance are thin-film thickness changes and the development of microfractures. These factors increase the transmittance and decrease the reflectance corresponding to positive strains. For compressive strains, the inverse effect occurs. Factors which influence the change in central image transmittance include changes in the film effective thickness, the development of microfractures, and the effect of diffraction. The effect of diffraction is to deflect energy into higher order components and therefore to decrease central image transmittance. It is the compressive wrinkling which causes diffraction and where none of the principle strains are negative, the effect of diffraction may be ignored. Essentially, the change in central image transmittance or central image reflectance is equal to the change in the total transmittance or total reflectance reduced by the influence of diffraction.

It is therefore possible in many cases to completely determine the strain field for a general biaxial problem by making two sets of experimental measurements, either total and central image transmittance or total and central image reflectance and by substitution of the changes in these quantities into the equations:

$$\Delta T_{total} = W_1 \epsilon_x' + W_2 \epsilon_y'$$

$$\Delta R_{total} = W_3 \epsilon_x' + W_4 \epsilon_y' \quad (1)$$

where
$W_1, W_2$ - proportionality functions associated with total transmittance
$W_3, W_4$ - proportionality functions associated with total reflectance
$\epsilon_x', \epsilon_y'$ - principal strains in X and Y directions, respectively, and, $$\Delta T_{central\ image} = W_1 \epsilon_x' + W_2 \epsilon_y' - J_1 \epsilon_x' - J_2 \epsilon_y'$$

$$= \Delta T_{total} - J_1 \epsilon_x' - J_2 \epsilon_y'$$

$$\Delta R_{central\ image} = W_3 \epsilon_x' + W_4 \epsilon_y' - J_3 \epsilon_y' - I J_4 \epsilon_y'$$

$$= \Delta R_{total} - J_3 \epsilon_x' - J_4 \epsilon_y' \quad (2)$$

where $W_1 W_2$ = proportionality functions associated with total transmittance
$W_3 W_4$ = proportionality functions associated with total reflectance
$J_1, J_2, J_3, J_4$ = proportionality functions associated with diffraction
$J_1, J_3 = 0$ if $\epsilon_x'$ is positive
$J_2, J_4 = 0$ if $\epsilon_y'$ is positive, and
$\epsilon_x', \epsilon_y'$ = principal strains in X and Y directions, respectively.

The proportionality functions used in equations (1) and (2) ($W_1, W_2, J_1$ and $J_2$ for transmittance experiments, and $W_3, W_4$ $J_3$, and $J_4$ for reflectance experiments) are determined from calibration tests. The magnitude of the proportionality functions will normally be different for tensile and compressive strains. Proportionality functions for positive strains are evaluated using equation (1) and the total transmittance or total reflectance data are a uniaxially loaded tensile specimen which is laterally restrained against deformations in the transverse direction. Calibration for negative strains (compressive) is accomplished by conducting uniaxial tension tests in which lateral compressive strain occurs due to Poisson's effect. Proportionality functions for compressive strains are calculated by subtracting the total transmittance or total reflectance response taken from the laterally restrained uniaxial tension test from the total transmittance or total reflectance measured in the laterally unrestrained test. Proportionality functions associated with diffraction are determined by making the central image transmittance or central image reflectance measurements for the unrestrained tensile specimen and then subtracting the total transmittance or total reflectance measurements for the same test.

It is necessary to the solution of a problem to independently determine the directions of principal strains and whether they are positive or negative. Either or two techniques can be used to identify the directions of principal strains: (1) the microscopic examination of the wrinkle and microfracture patterns, and (2) visual observation of the diffraction grating pattern. In most cases these patterns develop along principal directions; however, if both principal strains are compressive, wrinkle line elements will be oriented at an angle relative to the principal directions. The orientation angle depends on the relative magnitude of the two principal compressive strains. Identification of positive or negative strains follows from the existence of microfractures (positive strains) or wrinkles (negative strains).

Any suitable and conventional coating technique may be employed to provide the thin metallic film to the substrate. The vapor deposition process is particularly useful for depositing the thin film metals of the present invention since this process is easily controlled for thickness and results in films of high purity. Films of 20 to 500 angstroms are considered applicable for use in the present invention and are referred to herein as "thin films." An additional coating process applicable for use with the present invention is disclosed in NASA Case No. LAR 10514-1 filed concurrently herewith.

The basic experimental test arrangement involves one or more of the schematic illustrations shown in FIGS. 1-7. This instrumentation includes a suitable conventional load displacement instrument and recorder; a fiber optics light system; an optical system consisting of filters, lenses, and apertures; a photomultiplier tube; a kinematic optical bench; an X-Y axis optics transporter and a test specimen. Tests are conducted with the room darkened and with shields strategically located to mask out stray light from the light source. The load instrument applies a load by advancing the crosshead to which is attached the lower specimen clamp at a constant displacement rate. The upper specimen clamps attach via a coupling to a strain-gage type load cell and can be considered to maintain a fixed position. The load response is recorded graphically on a strip chart recorder which advances the paper at a constant rate of one-inch-per-minute, or the like, as is conventional in a tensiometer. Thus, the distance from the starting position is uniquely related to the crosshead displacement.

The light source employed is a 150-watt tungsten filament bulb having a visible light spectral response of 3,500 to 6,000 angstrom wavelength with a line voltage, being conditioned by an a.c. voltage regulator ($110 \pm 1$ volt) in order to provide a constant intensity output. The light is channeled to the light source tube by a 0.125-inch diameter bundle of 50-micron diameter glass fibers. The light source tube contains a collimator lens and a circular aperture to control the size of the beam. Various narrow band filters may be employed to place in front of the light source tube aperture for selection of a specified wavelength of light for study.

The photomultiplier tube schematically shown in the drawings is housed in a circular 3-inch-diameter, 24-inch long tube. The face of the photomultiplier tube is located 6¼ inches from one end of the circular tube. The electrical leads from the photomultiplier tube connects to a conventional amplifier with the response being recorded graphically on a conventional strip chart recorder with the chart advance rate of one-inch-per-minute being employed.

The optical system is mounted on a kinematic optical bench to allow continuous monitoring of the same area of a specimen during a load test. The lower mount of the bench is attached to the fixed base of the load instrument and the upper mount is attached to the moving crosshead. The kinematic optical bench translates at a ratio of one-to-two relative to the crosshead. The X-Y axis optics transporter is motor driven in the Y-direction at a constant displacement rate and hand driven in the X-direction. The transporter motor control allows a continuous range of speeds of from zero to 2 inches-per-minute and both axes have a millimeter scale and a vernier.

Three variations of this basic instrumentation are employed in the present invention corresponding to tests in which the total intensity, central image intensity and scan data were recorded.

Total intensity transmittance test measurements require an optical system which collects not only the central image but also the diffracted side bands. This is accomplished as schematically shown in FIG. 3 wherein a 2-inch diameter collector lens 34 is mounted in the end of a circular tube, not designated, housing the photomultiplier tube 35. The total intensity of light incident upon film 31 on specimen 32 was limited by a 0.004-inch diameter circular aperture 33 located approximately 0.1 inch from the metallic film 31 on specimen 32. The first order diffraction ring from this aperture fell well outside the collection area of the lens.

For central image transmittance measurements (FIG. 4) the collector lens is omitted and a pair of circular apertures 43 and 44, one-thirty-second inch in diameter are placed approximately 16 inches apart in the circular tube (not designated) housing photomultiplier tube 45. These collimated apertures restrict the view of photomultiplier tube 45 to permit measurement of the central image response but are large enough to insure that the area for which transmittance is to be measured is large enough compared to the period of film wrinkling so as to obtain an averaging effect rather than some local anomaly.

Survey measurement of transmittance or reflectance of a plane stress problem are accomplished by mounting the entire optical system, instrumentation for transmittance (FIGS. 3 and 4) or reflectance (FIGS. 5 and 6) on the X-Y axis transporter and scanning the area of interest.

Before and after each test the transmittance of the specimen is measured on a conventional microdensitometer with a scan being in the region of specimen center in both the X and Y directions. This instrument reads optical density directly and has a zero-to-two full scale range. The result of this measurement is assumed as the initial transmittance of the specimen and is used to calibrate the transmittance response of the photomultiplier measurement system.

The substrate material used in the experimental test was Sylgard 184, a room temperature vulcanizing, transparent, silicone rubber manufactured by the Dow Corning Corporation. This silicone rubber is highly transparent throughout the entire wavelength range of the visible spectrum and is a dielectric (K approximately equal to zero), with an index of refraction of 1.430. The strainstress curve for this substrate is approximately linear for strain up to approximately 40 percent using the conventional Lagrangian strain definition. This silicone rubber also exhibits very little creep and is highly resilient.

Bulk metals employed for the thin films thus far have included aluminum, copper, gold, indium and silver all of which were better than 99.5 percent purity. As mentioned hereinbefore, thin film coatings of the metals in the range of 20 to 500 angstroms were applied to the silicone rubber substrate with all specimens being approximately 0.1 inch thick. The strain rate for the data was approximately 0.038 inch/inch/minute. Tests were also conducted at strain rates of approximately 0.38 and 3.8 inch/inch/minute but without any apparent change in the results.

To insure that the changes recorded were not due to the substrate, total and central image transmittance tests were conducted on uncoated silicone rubber specimens. The results showed strain to exercise negligible influence on either of these optical properties. It was also determined by comparing load-displacement curves for specimens with a variety of coatings and coating thicknesses that the thin film coating had no significant influence on stress-strain history.

In a test on a uniaxially loaded specimen of silicone rubber with a gold thin film coating which showed an initial transmittance of approximately 25 percent, the coated specimen was examined in transmitted brightfield lighting at magnitudes of conventional Lagrangian strain ranging from zero to 60 percent. The specimen was initially clear and without surface irregularities. As strain was applied an orthogonal set of lines developed which in general were alined along and perpendicular to the direction of the applied load. These lines began to assume definition at a strain of approximately 4 percent and slip lines became evident in certain regions.

The lines perpendicular to the direction of the applied load appear irregular and appear light in transmitted brightful and dark in reflected brightful lighting, thus indicating that there is physical separation of the thin film, or the development of microfractures. The number of microfractures per unit length progressively increases with increasing magnitude of strain. The lines parallel to the direction the applied load are straight and have a common frequency even across slip lines and microfractures. When transmitted and reflected brightful photomicrographs are compared, light and dark lines still appear but are due to the interaction of light with a nonplanar surface caused by a series of wrinkles in the thin film and not due to the microfractures. The frequency of these wrinkles increases as a function of increasing strain. A plot of a microdensitometer scan across a typical wrinkle of the film shows a periodic and roughly sinusoidal shape. The frequency of wrinkles versus strain for the gold coated silicone rubber substrate is shown in the table below:

| | Strain $\epsilon^L_x$ inch/inch | | | | |
|---|---|---|---|---|---|
| | 0 | 0.04 | 0.21 | 0.42 | 0.60 |
| microfracture width per unit length inch/inch | 0 | 0.08 | 0.14 | 0.24 | 0.34 |
| Wrinkle Frequency wrinkles/inch | 0 | 8400 | 10,200 | 11,100 | 11,800 |

Microscope examination of specimens of silicone rubber substrates with thin films of copper, aluminum, silver and indium showed these specimens to respond to loading in a manner similar to that of the gold described above with minor variation in the wrinkle frequency. The microscopic examination of all the metallic thin films deposited on the silicone rubber substrates subjected to uniaxial loading all exhibit characteristics wrinkling along the direction transverse to the direction of loading. The strain in the direction transverse to the direction of loading for a case of uniaxial loading is, of course, negative and subjects the thin film in this direction to a state of compression loading. Wrinkling in the direction of loading confirmed the compressive wrinkling suspected for a thin metallic film deposited on a relatively thick low modulus substrate.

The experimental studies described herein of the total and central image transmittance properties of thin metallic films deposited on a low modulus substrate establish that a measurable variation in these properties occurs as a result of uniaxial loading of the substrate. In general, the total transmittance increases with increasing magnitudes of imposed strain and in some cases the relationship is linear. It is believed that the change in total transmittance response is caused by: (1) change in the thin film effective thickness and (2) the development of microfractures. Microscopic surface examination studies show that the accumulative width of microfractures per unit length increases with increasing magnitude of positive strain and the data obtained indicates the influence of effective thickness changes. The central image transmittance may exhibit either increasing or decreasing relationships to an imposed strain field which is compressive in one of the principal directions. The central image transmittance is also influenced by diffraction effects which are a result of the response of light to a set of closely spaced wrinkles that develop in the thin film coating along the direction of the principle compressive strain. Microscopic surface examination studies confirm the existence of these closely spaced wrinkles and also that the wrinkle frequency, in general, increased with increasing magnitudes of compressive strain. Visual observations and photographic results also demonstrate the spectral wavelength separation resulting from this closely spaced wrinkle diffraction grating.

Change in transmittance properties are detectable for a range of strains of from on the order of 1 percent or less to very large magnitudes of on the order of 100–200 percent. The upper limit is dependent on the materials used and the initial film thickness. The direction of principal strains as well as their magnitudes are important in the complete identification of the mechanical state of the material at any point. The microscopic examination of the wrinkles and microfractures which aline themselves along principal directions helps identify direction and sign (tensile or compressive) of the strain.

The present invention thus establishes that the changes in the mechanical state of a structure as a result of loading can relate to the optical properties of a thin metallic film deposited on the structure. The fundamental types of optical responses involved are: (1) changes in the total intensity and (2) changes in the central image intensity of light energy transmitted or reflected by the material. The reflectance types of measurements are important in determining the mechanical response of opaque structures using the process of the present invention.

The results of experimental studies of the strain field in the vicinity of a centrally located circular hole in the uniaxially loaded rectangular plate specimen demonstrate that the determination of the strain field of a biaxial or planar stressed specimen is also readily obtained.

Although a set of total and central image measurements appear to be sufficient to completely define the strain field of a specimen, in some instances it may be desirable to combine these with existing experimental techniques such as photoelasticity or holography for the solution of a problem. Also, the regularity of wrinkles and manner in which their frequency varies with strain suggest that a moire approach could be developed in which fringes are created by the superposition of a set of photomicrographs of the same specimen area taken at successive levels of strain. Also, the present invention is most applicable to the study of problems with large deformations.

Although the invention has been described relative to a specific substrate and to specific metallic coatings, it is not so limited. The critical criterion for practice of the present invention is that the substrate be a low modulus material that can experience large deformations and that the coating film have high absorptance and high modulus relative to the substrate properties. Thus, nonmetallic coatings with these properties are considered to be within the scope of the invention.

There are obviously many modifications and variations of the present invention possible in the light of the above teachings and the specific embodiments of the invention described herein are to be considered as illustrative and not exhaustive. It is therefore to be understood that the invention may be practiced otherwise than as specifically described.

What is claimed as new and desired to be secured by Letters Patent of the United States is:

1. A strain analysis process for determining the strain field of a structure specimen comprising:
    providing a transparent structural substrate specimen,
    depositing a relatively thin metallic film on one surface of said specimen,
    measuring the optical properties of total and central image transmittance of said film coated specimen,
    subjecting said film coated specimen to biaxial stress loads while continuously measuring the optical properties of total and central image transmittance thereof,
    whereby the changes in transmittance optical properties of said film coated specimen are indicative of the strain field of said structural specimen.

2. The process of claim 1 wherein said structure specimen is a low modulus material and the metallic film deposited thereon is in the range of 20–500 angstroms thick.

3. The process of claim 1 wherein said metallic coating is selected from the group of metals consisting of indium, aluminum, gold, silver and copper.

4. A strain analysis process for determining the strain field of a transparent polymeric material comprising:
    providing a transparent polymeric material specimen,
    depositing a metallic film coating in the range of 20–500 angstroms thickness on said specimen,
    measuring the optical properties of total and central image transmittance of said film coated specimen,
    subjecting said film coated specimen to biaxial stress loads while continuously measuring the optical properties of total and central image transmittance thereof,
    whereby the changes in total and central image transmittance optical property characteristics of said film coated specimen are indicative of the strain field of said structural specimen.

5. A strain analysis process for determining the strain field of a low modulus transparent polymeric material comprising:
    providing a transparent polymeric material specimen,
    subjecting said specimen to a predetermined stress load and while said specimen is stressed,
    depositing a relatively thin coating of a metal selected from the group consisting of indium, aluminum, gold, silver and copper on one surface of said specimen,
    measuring the optical property characteristics of total and central image transmittance of said stressed film coated specimen,
    gradually decreasing the stress load on said specimen while continuously measuring the changes in total and central image transmittance property characteristics until all stress load is removed,
    whereby the changes in total and central image transmittance optical property characteristics of said film coated specimen are indicative of the strain field of said structural specimen.

6. A strain analysis process for determining the strain field of an opaque high modulus structure specimen comprising:
    providing an opaque high modulus structure specimen,
    coating a thin layer of low modulus elastomeric material on said specimen,
    depositing a relatively thin metallic film selected from the group of metals consisting of indium, aluminum, gold, silver and copper on the exposed surface of said low modulus layer,
    measuring the optical properties of total and central image reflectance of said film coated specimen,
    subjecting said film coated specimen to biaxial stress loads while continuously measuring the optical properties of total and central image reflectance thereof,
    whereby the changes in total and central image reflectance optical properties of said film coated specimen are indicative of the strain field of said structural specimen.

7. A strain analysis process for determining the principle directions and signs of local strains of a structural specimen comprising:
    providing a low modulus structural substrate specimen,
    depositing a metallic film in the range of 20–500 angstroms thickness and selected from the group of metals consisting of indium, aluminum, gold, silver and copper on one surface of said specimen,
    subjecting said film coated specimen to biaxial stress loads of sufficient magnitude as to cause multiple microscopic wrinkles and microfractures in said film,
    microscopically examining the stress loaded film coated specimen,
    whereby the microscopic wrinkle and microfractures which develop are indicative of the directions and signs of the local principle strains of said structural specimen.

8. The method of claim 7 wherein the microscopic wrinkle and microfracture patterns form a diffraction grating whereby the orientation of collimated light diffracted thereby is indicative of the directions and signs of the local principal strains of said structural specimen.

9. The method of claim 7 and further including the step of measuring the wrinkle lines per unit length and the density of microfractures at the load values of interest whereby the density of microfractures and wrinkle line elements are indicative of the strain field of said structural specimen.

10. A strain analysis process for determining the strain field of a structure specimen comprising:
providing a transparent structural substrate specimen,
depositing a relatively thin metallic film on one surface of said specimen,
measuring the optical properties of total and central image reflectance of said film coated specimen,
subjecting said film coated specimen to biaxial stress loads while continuously measuring the optical properties of total and central image reflectance thereof,
whereby the changes in total and central image reflectance optical properties of said film coated specimen are indicative of the strain field of said structural specimen.

11. The process of claim 10 wherein said structure specimen is a low modulus material and the metallic film deposited thereon is in the range of 20–500 angstroms thick and is selected from the group of metals consisting of indium, aluminum, gold, silver and copper.

12. A strain analysis process for determining the strain field of a transparent polymeric material comprising:
providing a transparent polymeric material specimen,
depositing a metallic film in the range of 20–500 angstroms thickness on said specimen,
measuring the optical properties of total and central image reflectance of said film coated specimen,
subjecting said film coated specimen to biaxial stress loads while continuously measuring the optical properties of total and central image reflectance thereof,
whereby the changes in total and central image reflectance optical property characteristics of said film coated specimen are indicative of the strain field of said structural specimen.

13. A strain analysis process for determining the strain field of a low modulus transparent polymeric material comprising:
providing a transparent polymeric material specimen,
subjecting said specimen to a predetermined stress load and while said specimen is stressed,
depositing a relatively thin coating of a metal selected from the group consisting of indium, aluminum, gold, silver and copper on one surface of said specimen,
measuring the optical property characteristics of total and central image reflectance of said stressed film coated specimen,
gradually decreasing the stress load on said specimen while continuously measuring the changes in total and central image reflectance property characteristics until all stress load is removed,
whereby the changes in total and central image reflectance optical property characteristics of said film coated specimen are indicative of the strain field of said structural specimen.

* * * * *